July 20, 1965 K. R. THOMPSON 3,196,262

BINARY COMPARATOR

Filed Dec. 14, 1961 2 Sheets-Sheet 1

INVENTOR.
KENNETH R. THOMPSON
BY
Jim Comfort
ATTORNEY

July 20, 1965 | K. R. THOMPSON | 3,196,262

BINARY COMPARATOR

Filed Dec. 14, 1961 | 2 Sheets-Sheet 2

INVENTOR.
KENNETH R. THOMPSON
BY
Jim Comfort
ATTORNEY

United States Patent Office 3,196,262

Patented July 20, 1965

3,196,262

BINARY COMPARATOR

Kenneth R. Thompson, Roanoke, Va., assignor to General Electric Company, a corporation of New York Filed Dec. 14, 1961, Ser. No. 159,264
5 Claims. (Cl. 235—177)

Figure 1A:
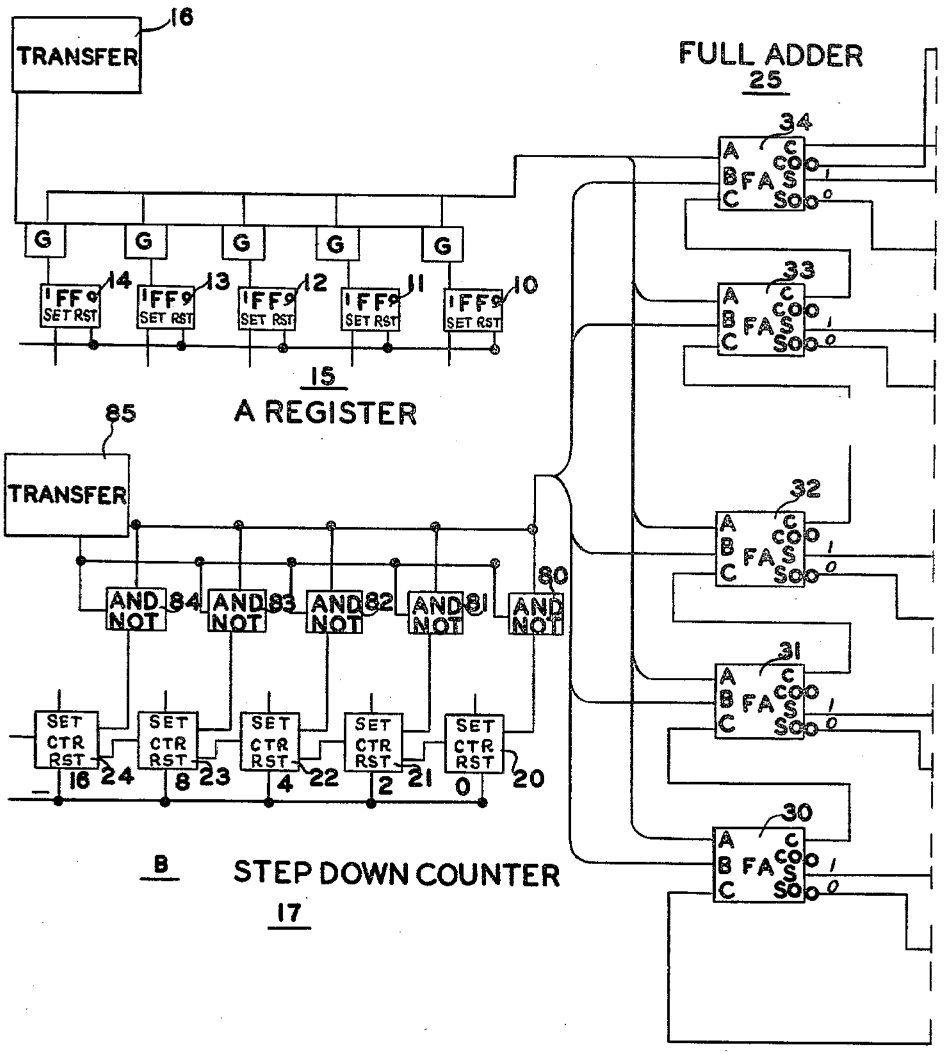

This invention relates to a comparator device and more particularly to a high speed comparator device for comparing two binary numbers.

In digital control systems for controlling and regulating machines and processes it is often necessary to compare two binary numbers. For instance, the reference and feedback of a drive are continuously compared to determine the direction and magnitude of correction required to control the machine or process. Such a comparison requires a determination of which number is larger and the absolute difference between the two numbers.

It is therefore an object of this invention to provide a new and improved comparator device for determining the larger of two binary numbers and the absolute difference between the two binary numbers.

According to the principles of this invention a binary comparator compares a first binary number with a second binary number in the following manner. A third binary number, greater than the first or second binary number, is added to the first binary number to provide a first binary sum and added to the second binary number to provide a second binary sum. The first binary sum is added to the one's complement of the second binary sum in a full adder. A no carry signal from the highest order of the full adder indicates that the second binary number is larger than the first binary number and the no carry signal is used jointly with the one's complement of the binary number in the full adder to produce a binary number representing the difference between the first and second binary numbers. A carry signal from the highest order of the full adder indicates that the first binary number is larger than the second binary number and is used jointly with the binary number in the full adder to produce a binary number representing the difference between the first and second binary numbers.

Thus, a binary comparator constructed in accordance with the principles of this invention compares two binary numbers and determines which is the larger of the two binary numbers and the absolute difference between the two binary numbers.

The novel features of the invention are set forth with particularity in the appended claims. The invention itself, however, both as to its organization and method of operation, together with further objects and advantages thereof, may best be understood by referring to the following description and the accompanying drawings.

Figure 1B:
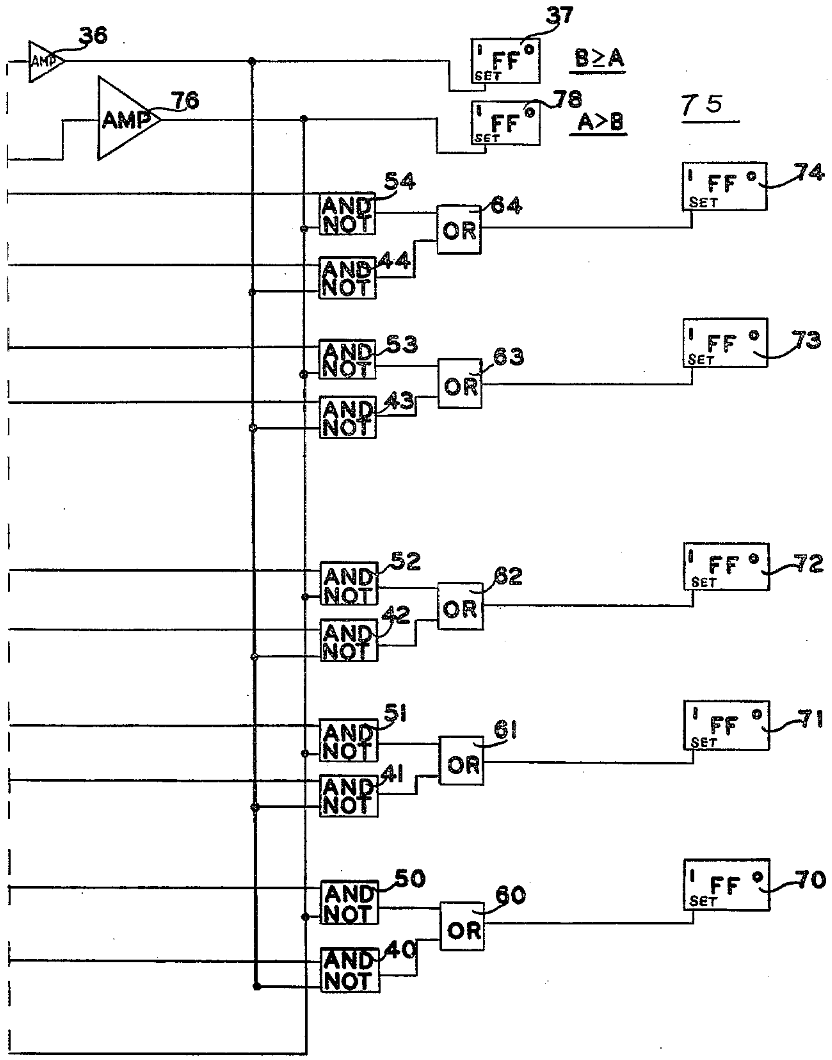

In the drawings:

FIGURES 1A and 1B, when placed side by side with FIGURE 1A on the left, show a schematic of a binary comparator constructed in accordance with the principles of this invention.

AND/NOT circuits are referred to in the following description and shown in the drawings. They are well known in the art. An AND/NOT circuit produces a signal when no signal is received on any of its input terminals and produces no signal when a signal is received on any of its input terminals.

For a better understanding of this invention, reference should be made to FIGURES 1A and 1B for a description of the comparison of two binary numbers in a binary comparator embodying this invention. A first binary number, binary number 0101 (decimal 5) is inserted in A register 15 by setting flip-flops 10 and 12 to "one." A second binary number, binary number 0111 (decimal 7)

is inserted in B stepdown counter 17 by setting counter bits 20, 21 and 22 to "one."

A number N, larger than the maximum size of the two numbers to be compared, is added to each number to establish the range of the numbers handled by the comparator. The maximum size of both numbers to be compared in this example is binary 1111 (decimal 15), so the binary number 10000 (decimal 16) is added to both numbers by setting flip-flop 14 to "one" in A register 15 and setting counter bit 24 to "one" in B stepdown counter 17. The comparator can handle numbers of any size by extending registers A and B and the full adder logic.

Henceforth, the binary number in A register 15, including the number N, will be referred to as number A and the number in B stepdown counter 17, including the number N, as number B.

To effect a comparison of the binary numbers, number A and the one's complement of number B are transferred to full adder 25 and full add of number A and the one's complement of number B is effected.

After the full add, the absolute difference between the two numbers compared rests in register 75. Flip-flop 37 set to "one" indicates that the second number in the B stepdown counter 17 is larger than or equal to the first number in the A register 15 while flip-flop 78 set to "one" indicates that the first number in A register 15 is larger than the second number in B stepdown counter 17.

As an example of such a comparison, assume that number A in A register 15 is 10101 (decimal $5+N$ [decimal 16]=decimal 21) and that number B in B stepdown counter 17 is 10111 (decimal $7+N$ [decimal 16]=decimal 23). The one's complement of 10111 (decimal 23) is 01000. Thus in the full adder 25, number A, 10101, is added to the one's complement of number B, 01000.

| | |
|---|---|
| Number A | 10101 |
| Plus one's complement of number B | 01000 |
| Equals | 11101 |

A signal on terminal CO of full adder element 34 indicates there is no carry of "one" from the full adder element 34 and that number B is larger than number A. The no carry of "one" signal is amplified by amplifier 36 and applied to flip-flop 37 to set it to "one" to indicate the number B is equal to, or greater than, the number A.

The no carry of "one" signal from terminal CO of full adder element 34 after amplification by amplifier 36 is also applied to AND/NOT circuits 40–44 to cause the AND/NOT circuits 40–44 to produce no output signals as AND/NOT circuits do not produce an output signal when a signal is received on either input terminal.

After the full add, the binary number 11101 rests in the full adder 25 with full adder elements 30, 32, 33 and 34 set to "one" and full adder element 31 reset to "zero." Full adder elements 30, 32, 33 and 34 thus produce a signal from their "one" output terminals (labeled S) to AND/NOT circuits 50, 52, 53 and 54 and full adder element 31 does not apply a signal from its "one" output terminal to AND/NOT circuit 51. As there was no carry of "one" from full adder element 34, no signal was delivered from the carry terminal C of full adder element 34 to AND/NOT circuits 50–54. Thus AND/NOT circuit 51 receives no signals on its input terminal and delivers a signal from its output terminal which passes through OR circuit 61 to set flip-flop 71 to its "one" state. Flip-flops 70, 72, 73 and 74 remain reset to "zero" so that the difference between the binary numbers, 00010 (decimal 2), has been transferred to register 75.

Thus the comparator has compared a first number 0101 (decimal 5) with a second number 0111 (decimal 7) and indicated the absolute difference as 0010 (decimal 2).

Flip-flop 37 set to "one" indicates that the second number in B stepdown counter 17 is equal to or larger than the first number in A register 15.

For a further understanding of this invention, a comparison will be described where the number in A register 15 is larger than the number in B stepdown counter 17. Assume that a binary number 1111 (decimal 15) is entered into A register 15 and that a binary number 0111 (decimal 7) is entered into B stepdown counter 17. The binary number 10000 is added to both numbers by setting flip-flop 14 in A register 15 to "one" and counter bit 24 in B stepdown counter 17 to "one." Therefore, number A is a binary number 11111 (decimal 31) and number B is a binary number 10111 (decimal 23). Assume that the binary number 10111 (decimal 23) in the B stepdown counter 17 is stepped down to the binary number 01011 (decimal 11) and then compared with the binary number in A register 15. The binary number A, 11111 (decimal 31), is added to the one's complement of the binary number B, 10100.

| | |
|---|---|
| Number A | 11111 |
| Plus one's complement of number B | 10100 |
| Equals | 10011 |
| Plus carry of "one" | 1 |
| Equals | 10100 |

A carry of "one" signal is delivered from the C terminal of full adder element 34, amplified by amplifier 76, applied to AND/NOT circuits 50–54, added to full adder element 30 to complete the addition, and sets flip-flop 78 to "one," indicating that number A is greater than number B. As no signal is delivered from the no carry output terminal CO of full adder element 34, no signal is applied to AND/NOT circuits 40–44.

Full adder elements 32 and 34 are set to "one" and do not deliver a signal on their "zero" output terminals (labeled SO) to AND/NOT circuits 42 and 44 so that AND/NOT circuits 42 and 44 deliver a signal on their output terminals which are passed to OR circuits 62 and 64 to set flip-flops 72 and 74 to "one." Flip-flops 70, 71 and 73 remain reset to "zero" so that the binary number 10100 (decimal 20) rests in register 75 indicating that the difference between the two binary numbers is 10100 (decimal 20).

Thus it has been described how to compare two numbers and derive an indication of which is larger and the difference between the two numbers.

A register 15 is a standard register composed of gates and flip-flops. The flip-flops may be set to "one" by a pulse applied to the "one" input terminal and reset to "zero" by a pulse applied to the "zero" input terminal. When the flip-flops are set to "one" the flip-flops produce a D.-C. level which conditions a corresponding gate.

When the number in A register 15 is to be transferred to full adder 25, a pulse is applied to all of the gates from transfer circuit 16 and all gates which are conditioned pass a pulse which is applied to a corresponding full B stepdown counter 17 is composed of five counter bits 20–24 and operates as a stepdown binary counter. All counter bits are first cleared to the "zero" state so that a negative signal is delivered from the "zero" terminal of each counter bit. The preset number is set into the preset counter by setting the appropriate counter bits to "one" so the proper preset number rests in the counter. Each pulse applied to the preset counter causes a binary "one" to be subtracted from the counter. A signal applied to the input terminal of each counter bit causes the counter bit to change states. The change of states occurs on the positive going side of the signal. The switching of a counter bit from "zero" to "one" causes the negative signal from the "zero" output terminal to go from a negative signal to ground potential. Thus the positive going signal causes the succeeding counter bit to change states. If the succeeding counter bit changes from "zero" to "one" the positive going output signal from the "zero" terminal of the counter bit causes the next counter bit to change states, and so on. Thus the counter operates a stepdown counter with each pulse applied causing the counter to step down one number.

The one's complement of the number in B stepdown counter 17 is transferred to full adder 25 in the following manner: Assume the one's complement of the binary number 10100 is to be transferred to full adder 25. AND/NOT circuits 80–84 produce a signal when no signal is received on either input terminal. So when no transfer is to be effected, a signal is applied to each AND/NOT circuit from transfer circuit 85. The signal from the "one" output terminal of each counter bit is also applied to a corresponding AND/NOT circuit 80–84. When a transfer of the one's complement of the number in B stepdown counter 17 is to be transferred, the signal from transfer circuit 85 is removed from all of the AND/NOT circuits 80–84. The counter bits set to "zero" also apply no signals to their respective AND/NOT circuits from their "one" terminals and those AND/NOT circuits with no input signals deliver a signal to full adder 25. With binary number 10100, counter bits 20, 21 and 23 are set to "zero" and no signal is applied to AND/NOT circuits 80, 81 and 83 so AND/NOT circuits 80, 81 and 83 delivers a signal to full adder 25, transferring the binary number 01011, which is the one's complement of binary number 10100, to full adder 25.

Full adder 25 is composed of full adder elements 30–34. Each full adder element receives three inputs (two numbers and a carry) and produces four ioutput signals (set to "one," set to "zero," carry and no carry). The truth table is as follows:

| Inputs | | | Outputs | | | |
|---|---|---|---|---|---|---|
| A | B | C | S | SO | C | CO |
| 0 | 0 | 0 | 0 | 1 | 0 | 1 |
| 1 | 0 | 0 | 1 | 0 | 0 | 1 |
| 0 | 1 | 0 | 1 | 0 | 0 | 1 |
| 0 | 0 | 1 | 1 | 0 | 0 | 1 |
| 1 | 1 | 0 | 0 | 1 | 1 | 0 |
| 0 | 1 | 1 | 0 | 1 | 1 | 0 |
| 1 | 0 | 1 | 0 | 1 | 1 | 0 |
| 1 | 1 | 1 | 1 | 0 | 1 | 0 |

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. A binary comparator for comparing a first binary number with a second binary number comprising means for adding a third binary number, larger than said first or second binary numbers, to said first binary number to provide a first binary sum and to said second binary number to provide a second binary sum, means for converting said second binary sum to its one's complement, full adder means for full adding said first binary sum and the one's complement of said second binary sum to provide a third binary sum, means for deriving a difference signal from said full adder means, and means for using jointly said third binary sum and said difference signal to provide an indication of the magnitude of the difference between said first and second binary numbers.

2. A binary comparator for comparing a first binary number with a second binary number comprising means for adding a third binary number, larger than said first or second binary number, to said first binary number to provide a first binary sum and to said second binary number to provide a second binary sum, means for converting said second binary sum to its one's complement, full adder means for full adding said first binary sum and the one's complement of said second binary sum to provide a third binary sum, and means for deriving a difference signal from said full adder means for indicating which is the larger number.

3. A binary comparator for comparing a first binary number with a second binary number comprising means for adding a third binary number, larger than said first or second binary number, to said first binary number to provide a first binary sum and to said second binary number to provide a second binary sum, means for converting said second binary sum to its one's complement, full adder means for full adding said first binary sum and the one's complement of said second binary sum to provide a third binary sum, means for deriving a difference signal from said full adder means for indicating which is the larger number, and means for using jointly said third binary sum and said difference signal to provide an indication of the magnitude of the difference between said first and second binary numbers.

4. A binary comparator for comparing a first binary number with a second binary number comprising means for adding a third binary number, larger than said first or second binary number, to said first binary number to provide a first binary sum and to said second binary number to provide a second binary sum, means for converting said second binary sum to its one's complement, full adder means for full adding said first binary sum and the one's complement of said second binary sum to provide a third binary sum, means for deriving a carry signal from said full adder means when said first number is larger than said second number, and means for deriving a no carry signal from said full adder means when said second number is equal to, or larger than, said first number.

5. A binary comparator for comparing a first binary number with a second binary number comprising means for adding a third binary number, larger than said first or second binary number, to said first binary number to provide a first binary sum and to said second binary number to provide a second binary sum, means for converting said second binary sum to its one's complement, full adder means for full adding said first binary sum and the one's complement of said second binary sum to provide a third binary sum, means for deriving a carry signal from said full adder means when said first number is larger than said second number, means for deriving a no carry signal from said full adder means when said second number is equal to, or larger than, said first number, means for combining said third binary sum with said carry signal when said first number is larger than said second number to provide an indication of the magnitude of the difference between said first and second binary number, and means for using jointly said third sum with said no carry signal when said second number is equal to or larger than said first number to provide an indication of the difference between said first and second binary numbers.

References Cited by the Examiner

UNITED STATES PATENTS

| | | | |
|---|---|---|---|
| 2,907,877 | 10/59 | Johnson | 340—146.2 |
| 3,010,655 | 11/61 | Ketchledge | 235—177 |

ROBERT C. BAILEY, *Primary Examiner.*

DARYL COOK, *Examiner.*